C. F. WOHLFARTH & C. W. WAKEFIELD.
Assignors, by direct and mesne assignments, to W. F. COLLINS and T. MILBURN.
CAR BRAKE.
No. 10,671. Reissued Dec. 8, 1885.
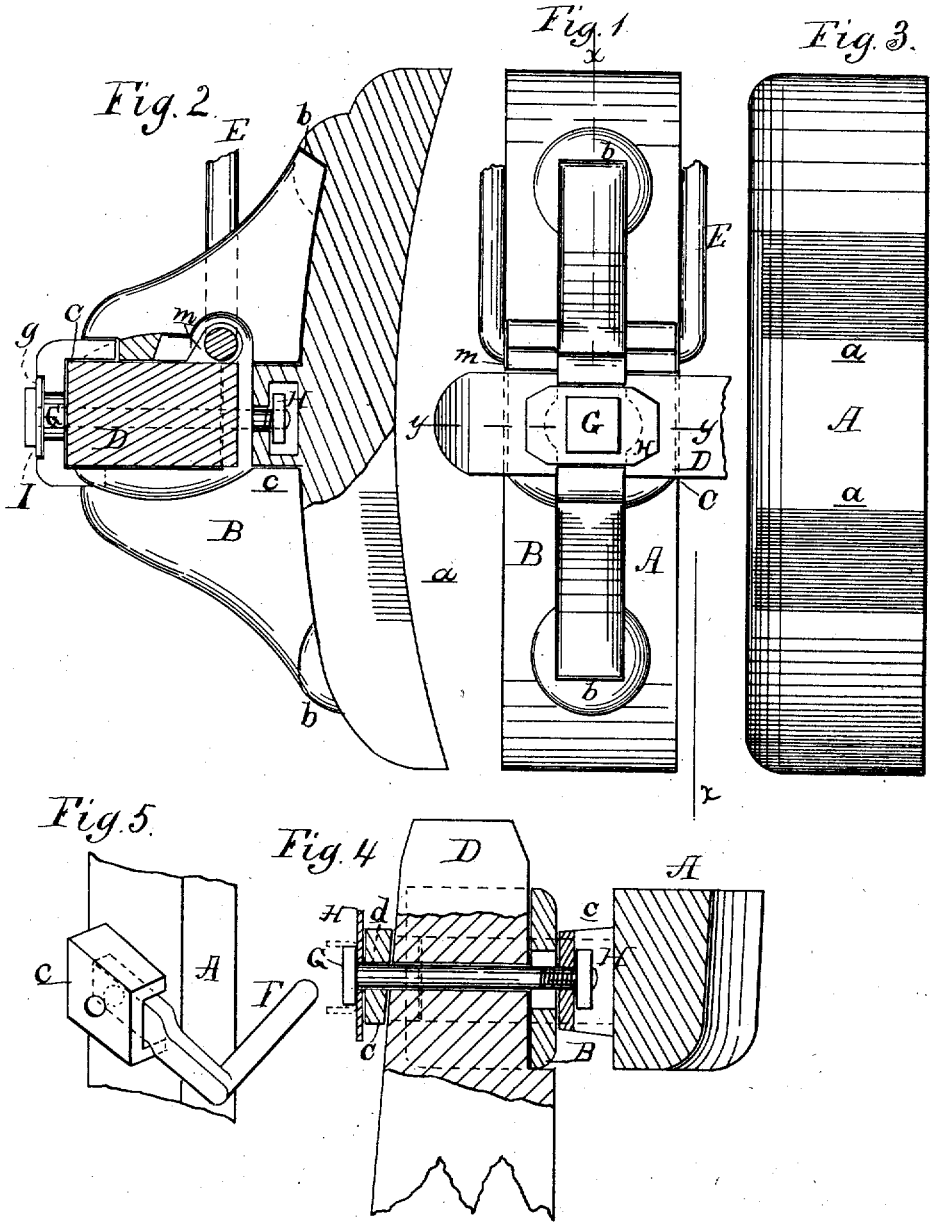
Witnesses —
Frank H. Allen,
Tyler J. Howard.
Inventors —
Charles F. Wohlfarth
Clovis W. Wakefield.
By their Attorney
Allen Tunnyer

UNITED STATES PATENT OFFICE.

CHARLES F. WOHLFARTH AND CLOVIS W. WAKEFIELD, OF NORWICH, CONNECTICUT, ASSIGNORS, BY DIRECT AND MESNE ASSIGNMENTS, TO WILLIAM FITZPATRICK COLLINS AND THOMAS MILBURN, BOTH OF TORONTO, CANADA.

CAR-BRAKE.

SPECIFICATION forming part of Reissued Letters Patent No. 10,671, dated December 8, 1885.

Original No. 229,510, dated June 29, 1880. Application for reissue filed March 17, 1885. Serial No. 159,241.

*To all whom it may concern:*

Be it known that we, CHARLES F. WOHLFARTH and CLOVIS W. WAKEFIELD, of the city of Norwich, in the county of New London and State of Connecticut, have invented certain new and useful Improvements in Car-Brakes; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

The object of this invention is to provide a stronger and more durable brake-clog than those now in ordinary use.

One of the principal defects in an ordinary brake is that the shoe is fastened to the clog by bolts or keys that in a short time become loose, thereby causing a disagreeable rattling and increased expense and labor for repair, and the clog in time also works loose on the brake-bar because of the shrinking of the latter; and in ordinary brakes the brake-guide ordinarily consists of a straight piece of iron fastened to the end of a brake-bar itself, and consequently the guide does not always operate effectively.

Figure 1 is a plan of the device. Fig. 2 is a sectional side elevation of the same on line *x x*, Fig. 1. Fig. 3 is a plan of the face of the brake-shoe. Fig. 4 is a cross-section on line *y y*, Fig. 1. Fig. 5 is a perspective view of a portion of the clog, showing the brake-guide in position.

Similar letters of reference indicate corresponding parts.

In the drawings, A represents the brake-shoe, its curved face being chilled at certain points, *a a*, while the iron on each side of the chills, remaining soft, hugs the car-wheel, and yet cannot wear faster than permitted by the chills, the said chills causing the shoe to wear one-third longer than any ordinary brake-shoe, and involving no extra expense in casting. On the back of said shoe A, and near each end thereof, are the socketed lugs or stops *b b*, and centrally on the back of said shoe is formed a raised rectangular loop, *c*.

B is the brake-yoke, cut away centrally on its under side to fit over and upon the loop *c*, said yoke B having its ends prolonged and entered and tightly fitted into the sockets of the stops *b b*. A socket, C, for the reception of the end of brake-bar D, is formed transversely to said yoke B, the sides and bottom of said socket C being extended laterally, to afford better bearings for said brake-bar. A link, E, whereby the said brake-clog is suspended in position, is engaged in a groove, *m*, that is offset in the socket C.

F is a brake-guide, designed to prevent the brake-bar from swinging out of place when passing around a curve; and it consists of a bar of iron, preferably round, bent at right angles and having one end flattened and bored and entered at the loop *c* on the back of the shoe A, so that its other end shall project forward beyond the edge of the said shoe A, as shown in Fig. 5, and engage against the flange of the wheel when the car goes around a curve.

To secure the parts of this brake-clog together, the bolt G is passed down through a hole, *d*, formed centrally in the top of the yoke B, through the oblong opening *n* in the bar D, the bottom of the socket C, and into the loop *c* of the shoe A, and screwed into a nut, H, or, when the guide F is used, into said guide, which serves as an equivalent to the nut H in holding the end of the bolt G, neither nut nor guide being able to turn within the loop *c*. The oblong opening *n* at the bottom of the socket C prevents the threads of the bolt G from being injured by any strain upon them.

In a groove, *g*, formed around the bolt-hole in the yoke B, a plate of sheet metal, I, is laid down, through which the bolt G is passed, and the ends of said plate I are turned up about the head of said bolt G to lock the bolt securely against turning.

Having thus described our invention, we claim as new and desire to secure by Letters Patent—

1. A brake-shoe cast in one piece, having its wheel-engaging surface formed of alternating soft and chilled portions integral with the body of the shoe.

2. In a brake-clog, the combination, with the shoe A, provided with loop *c*, of the right-angled brake-guide F, substantially as herein shown and described.

3. The combination, with the shoe A and yoke B, of the screw-bolt G and brake-guide F, substantially as herein shown and described, whereby the said shoe and yoke are held together, as set forth.

CHARLES F. WOHLFARTH.
CLOVIS W. WAKEFIELD.

Witnesses:
ALLEN TENNY,
WM. S. CONGDON.